United States Patent [19]

Gibbs et al.

[11] Patent Number: 4,575,529
[45] Date of Patent: Mar. 11, 1986

[54] DISPERSIBLE VINYLIDENE CHLORIDE POLYMER POWDERS AS ADDITIVES FOR POLYMERS

[75] Inventors: Dale S. Gibbs; Jack H. Benson; Reet T. Fernandez, all of Midland, Mich.

[73] Assignee: The Dow Chemical Company, Midland, Mich.

[21] Appl. No.: 312,566

[22] Filed: Oct. 19, 1981

Related U.S. Application Data

[60] Continuation of Ser. No. 150,771, May 19, 1980, abandoned, which is a division of Ser. No. 942,510, Sep. 15, 1978, abandoned.

[51] Int. Cl.[4] ............... C08J 75/00; C08G 18/06
[52] U.S. Cl. ............... 524/507; 521/155; 521/159; 521/170
[58] Field of Search ............... 524/765, 568; 525/129

[56] References Cited

U.S. PATENT DOCUMENTS

| | | | |
|---|---|---|---|
| 2,459,746 | 1/1949 | Radcliffe | 524/568 |
| 3,226,370 | 12/1965 | Poindexter | 524/568 |
| 3,424,706 | 1/1969 | Smith et al. | 524/568 |
| 3,916,060 | 10/1975 | Fish et al. | 428/303 |
| 4,115,640 | 9/1960 | Kalka | 526/343 |
| 4,186,259 | 1/1980 | Bush et al. | 526/74 |
| 4,211,684 | 7/1980 | Koyama et al. | 526/273 |

FOREIGN PATENT DOCUMENTS

| | | | |
|---|---|---|---|
| 0010161 | 4/1980 | European Pat. Off. | 526/343 |
| 50-15833 | 7/1975 | Japan | 526/343 |
| 1416061 | 3/1975 | United Kingdom . | |

Primary Examiner—Joseph L. Schofer
Assistant Examiner—Peter F. Kulkosky
Attorney, Agent, or Firm—R. B. Ingraham

[57] ABSTRACT

A vinylidene chloride polymer powder, having a second order transition temperature of at least about 50° C., is recovered from a latex and dispersed with moderate shear in a non-solvent for vinylidene chloride polymers, such as a polyol used in the preparation of polyurethane materials. A dispersion of the powder and a polyol is eminently suitable for use in the preparation of polyurethane foams to impart enhanced flame retardancy and load-bearing properties thereto.

2 Claims, No Drawings

DISPERSIBLE VINYLIDENE CHLORIDE POLYMER POWDERS AS ADDITIVES FOR POLYMERS

This is a continuation of application Ser. No. 150,771, filed May 19, 1980, now abandoned, which is a division of Ser. No. 942,510, filed Sept. 15, 1978, now abandoned.

BACKGROUND OF THE INVENTION

The present invention relates to vinylidene chloride polymers and, more particularly to vinylidene chloride polymers which are dispersible in nonsolvents for such polymers.

Halogenated compounds, such as chlorinated polyethylenes, crosslinked copolymers of vinyl halides, bromophenols, vinylidene chloride polymers, and the like, have long been used as additives for polymeric materials to provide enhanced flame-retardancy. Typically, the object in this art has been to achieve such flame-retardancy without significantly decreasing other beneficial properties of the base polymeric material.

On the other hand, a great deal of art has also been developed on the incorporation of high molecular weight polymer additives in polymeric materials to enhance properties other than flame-retardancy. With respect to polyurethane foam materials in particular, it is known that the load-bearing properties can be improved by using additives such as aqueous elastomer latices, vinyl aromatic polymers, and film-forming polymers having radicals reactive with the isocyanate component of the foam. Generally, this art has required the use of a further additive to provide enhanced flame-retardancy.

It would be highly desirable to have a polymer additive which could be incorporated in polyurethane foam materials to provide both improved flame-retardancy and enhanced load-bearing properties.

Accordingly, it is a primary object of the present invention to provide such polymer additive. More specifically, it is an object of the present invention to provide such an additive in the form of a vinylidene chloride polymer powder that can be dispersed in a polyol used to prepare the polyurethane foam materials.

A more general object of the present invention is to provide a vinylidene chloride polymer powder which can be dispersed in a nonsolvent for vinylidene chloride polymers and thereafter used to prepare polymeric materials having enhanced physical properties.

SUMMARY OF THE INVENTION

In one aspect, the present invention resides in a composition of matter for use in the preparation of polymeric materials having enhances physical properties comprising (A) a nonsolvent for vinylidene chloride polymers and (B) a vinylidene chloride polymer powder, having a second order transition temperature of at least about 50° C., which is dispersible in the nonsolvent. The powder employed is obtained by a method comprising the steps of
(I) preparing a vinylidene chloride polymer latex by emulsion polymerizing about 50 to about 65 weight percent vinylidene chloride and at least one copolymerizable ethylenically unsaturated comonomer and
(II) recovering the vinylidene chloride polymer powder from the latex.

The latex polymer particles prior to recovery have a diameter less than about 1 micron.

In a further aspect, the present invention resides in such a composition of matter wherein the method for obtaining the powder further comprises, between steps (I) and (II), the steps of adding to the latex an effective degradation-reducing amount up to about 20 weight percent, based on the weight of the latex polymer, of a sequentially polymerizable monomer mixture comprising an ethylenically unsaturated non-vinylidene chloride monomer, and polymerizing the monomer mixture.

In another aspect, the invention resides in a polyurethane material prepared from such a composition of matter, e.g., wherein the nonsolvent comprises a polyol.

In a still further aspect, the present invention resides in an improvement in a method of forming a polyurethane material by reacting a polyfunctional isocyanate with an active-hydrogen-containing material, wherein the improvement is characterized by including in the reactant mixture a vinylidene chloride polymer powder obtained by the method hereinbefore described.

DETAILED DESCRIPTION OF THE INVENTION

The dispersible vinylidene chloride polymer powders of the present invention are recovered from latices which have been prepared by polymerization in an aqueous emulsion according to processes well known in the art. Preferably, the polymerization is carried out by essentially continuous, carefully controlled addition of the requisite polymerization constituents (including polymerization initiator systems if desired) to the aqueous medium.

Generally, it is preferred to start the polymerization by adding a small amount of monomeric material to the aqueous medium and then adding the desired polymerization initiator to form a polymeric seed latex to aid in the control of particle size. The aqueous medium in which the seed latex is formed will contain the necessary surfactants to form the emulsion and will generally be adjusted to the desired pH value, as is well known in the art. Following the formation of the seed latex, the remaining amount of monomeric material is continuously added under carefully controlled conditions to the aqueous medium.

In accordance with the present invention, the vinylidene chloride polymer latices are prepared by emulsion polymerizing about 50 to about 65 weight percent vinylidene chloride and at least one copolymerizable ethylenically unsaturated comonomer, e.g., alkyl esters of methacrylic acid, such as methyl methacrylate, and nitriles of ethylenically unsaturated carboxylic acids, such as acrylonitrile and methacrylonitrile. The resulting vinylidene chloride copolymer or interpolymer should have a second order transition temperature of of at least about 50° C., preferably at least about 65° C. Accordingly, the preferred monomer mixture employed in preparing the vinylidene chloride polymer comprises about 50 to about 55 weight percent vinylidene chloride with the remainder being selected from the aforementioned exemplary monomers.

In view of the fact that amine catalysts are typically used in the preparation of polyurethane foam materials to control the rate of urea and urethane reactions and that the urethane reactions are significantly exothermic, it will be appreciated by workers in the art that vinylidene chloride polymer powders recovered from the latices hereinbefore described could have a tendency to degrade and produce hydrogen chloride when used in such applications. The accelerated evolution of hydrogen chloride caused by such degradation could not only result in discoloration of the vinylidene chloride polymer and the resultant polyurethane foam material, but could also alter the kinetics of the urethane reaction.

It has been found that a moderate decrease in the propensity of such powders to discolor when exposed to the conditions of the polyurethane foam reaction and similar deleterious environments can be achieved by sequentially polymerizing the vinylidene chloride polymer latex particles with a monomer mixture comprising an ethylenically unsaturated non-vinylidene chloride monomer. Without intending to be bound by such theory, it is believed that the sequential polymerization provides a thin cap on the latex particles which protects them from the amine catalyst, thereby reducing the rate of decomposition.

The sequential polymerization can be carried out in a conventional manner by adding an effective degradation-reducing amount up to about 20 percent by weight of the vinylidene chloride polymer, preferably from about 5 to about 10 percent by weight, of the desired monomer mixture (including emulsifiers and initiators as needed) to the vinylidene chloride polymer latex and subjecting the monomer mixture to polymerization conditions. In a preferred mode, the desired monomer mixture for sequential polymerization is not added to the latex until it is certain that essentially all of the residual vinylidene chloride monomer has been depleted. Depletion of residual vinylidene chloride monomer can be accomplished, for example, by adding an additional amount of initiator or a minor amount of methyl acrylate to the polymerization vessel subsequent to the apparent completion of the vinylidene chloride polymer reaction, but prior to the addition of the sequentially polymerizable monomer mixture. In this manner, the possibility of including vinylidene chloride in the resultant non-vinylidene chloride polymer "cap" (which term will be occasionally used herein for convenience only) will be reduced.

In order to provide adequate dispersibility for purposes of this invention, the non-vinylidene chloride polymer "cap" which results from the sequential polymerization should either be uncrosslinked and have a second order transition temperature greater than about 60° C., preferably greater than about 65° C., or it should be crosslinked. If the "cap" is crosslinked, i.e., by copolymerizing a minor amount of a crosslinking polyfunctional comonomer with the desired ethylenically unsaturated non-vinylidene chloride monomer or monomers, the second order transition temperature requirement is not as critical, though values within the aforementioned range are preferred.

Exemplary ethylenically unsaturated non-vinylidene chloride monomers which can be used in the sequential polymerization reaction to prepare the "cap" polymer include the alkyl esters of methacrylic acid such as methyl methacrylate; the vinyl aromatic monomers such as styrene and vinyl toluene; and other sequentially polymerizable monomers, i.e., those which are compatible with the vinylidene chloride polymer and which are capable of producing a "cap" satisfying the aforementioned criteria.

Exemplary copolymerizable crosslinking polyfunctional comonomers which can be sequentially polymerized with the ethylenically unsaturated non-vinylidene chloride monomers include 1,3-butylene glycol diacrylate, 1,4-butane diol diacrylate, allyl acrylate, vinyl acrylate, 1,3-butylene glycol dimethacrylate, 1,4-butane diol dimethacrylate, allyl methacrylate, vinyl methacrylate, and the like. The amount of crosslinking monomer required for dispersibility will depend upon the efficiency of the particular crosslinking monomer chosen, as well as the ethylenically unsaturated monomer or monomers with which it is polymerized. Generally the amount of crosslinking monomer used, if any, will be less than about 6 percent of the weight of the sequentially polymerizable monomer mixture.

The diameter of the polymer particles in the resulting latex, which includes particles which have been "capped" by sequential polymerization as well as those which have not been "capped", should be less than about 1 micron. Preferably, the mean particle diameter is in the range of about 0.05 to 0.5 micron, most preferably in the range of about 0.1 to 0.3 micron, with substantially all of the polymer particles having a diameter within that range. The preferred ranges are especially applicable if the powders obtained therefrom are to be used in the preparation of polyurethane foam materials. Larger particles will produce less discoloration in the resultant polyurethane foam materials, but smaller particles have longer dispersion stability in the polyol starting material and also provide better load-bearing properties in the foam material. Accordingly, the aforementioned preferred range represents those sizes which will give the best overall balance of properties when used in the preparation of polyurethane foam material.

The vinylidene chloride polymer powders of the present invention are recovered from the latices by conventional techniques, preferably by coagulating the latex and then washing and drying the coagulum or by spray drying the latex to produce a fine powder. The optimum temperature for coagulation will vary depending upon the type and amount of comonomer employed in preparing the vinylidene chloride polymer and particularly upon the second order transition temperature of the resultant polymer. Generally, the coagulation temperature will be in the range of about 50 to 70° C., preferably from about 50 to 60° C.

It is necessary that the vinylidene chloride polymer powders of the present invention be dispersible in nonsolvents for vinylidene chloride polymers. For purposes of the present invention, "dispersibility" is measured under the following conditions: 20 weight percent of the desired powder is mixed with a polyol having a room temperature viscosity of about 900-1000 cps, (such as the polyol obtainable from The Dow Chemical Company under the trademark Voranol ® 4701) and the mixture is passed once through a Gifford-Wood colloid mill operating at 10,000 rpm with a gap setting 0.004 inch and then twice through a Gaulin homogenizer operating at 5000 psi. Under such conditions, substantially all of a powder suitable for use in the present invention will break down in the polyol and regenerate the original latex particles. Essentially all of the powder particles which do not break down to the latex particle size, if any, should be of a size less than about 100 microns.

As used herein, "nonsolvents for vinylidene chloride polymers" is intended to be descriptive of liquid organic reactants which are used in the preparation of polymeric materials. In particular, it is intended to include polyols, which are used in the preparation of polyurethane materials; dihydroxy alcohols, which are used in the preparation of polyester resins; and the like. In all cases, the vinylidene chloride polymer powders of the present invention are suitably employed to render the resulting polymeric materials more resistant to ignition and burning while generally retaining and/or improving other beneficial physical properties.

Conventional vinylidene chloride polymers can, in some instances, be blended directly with a suitable thermoplastic polymer to produce a satisfactory product. However, the vinylidene chloride polymer powders according to the present invention are advantageously incorporated into polymeric material by dispersing the powder in the desired nonsolvent liquid reactant with moderate shear and thereafter carrying out the contemplated polymerization reaction. It will be appreciated that the latter method is critically employed in the preparation of many foamed polymeric materials, particularly in the preparation of foamed polyurethane materials.

In accordance with the present invention, the use of the vinylidene chloride polymer powders in the preparation of polymeric materials having enhanced physical properties will now be described, by way of example, with respect to the preparation of polyurethane materials—which may or may not be foamed. Polyurethane materials are prepared by the methods well known in the art by reacting a polyfunctional isocyanate with a polyfunctional chemical compound having an active hydrogen in its structure such as a polyester, polyesteramide or polyether or mixture of two or more of such materials. The latter component is generally referred to as the "active-hydrogen-containing material" and is typically sufficiently liquid to permit mixing and reaction with the polyfunctional isocyanate in producing the polyurethane. The active-hydrogen-containing materials conventionally used contain hydroxyl groups as the radicals having the active hydrogen and thus are generally termed "polyols". The preparation of such materials is shown, for example, in U.S. Pat. No. 2,888,409 and in the patents referred to therein. In addition, other hydroxyl-capped polymers useful as the polyol in preparing polyurethane resins include polyformals as described, for example, in U.S. Pat. No. 3,055,871 to Heffler et al.; the hydroxyl-terminated lactone polyesters described in U.S. Pat. No. 3,051,687 to Young et al.; the alkylene oxide adducts of the alkyl alcohol-styrene polymers as described in U.S. Pat. No. 2,965,615 to Tess, et cetera. For reasons of commercial availability and cost, it is conventional to use polyethers having hydroxyl-terminated chains in the preparation of polyurethane foams and either such polyethers or hydroxyl-terminated polyesters in preparing vulcanizable gum, adhesive, films, et cetera. The polyurethane end products may occasionally be crosslinked to some extent by including with the polyol (which is generally di- or polyfunctional) a small amount of polyfunctional crosslinking agent.

The active-hydrogen-containing materials suitable for use in the preparation of polyurethane materials of the present invention are any of those known in the art and (1) which form stable and uniform dispersions with the vinylidene chloride polymer powders, which dispersions are preferably dilutable without the formation of undesirable precipitates with other components used to form the polyurethane; (2) which are liquids, at least at the temperatures used for preparing the dispersions and for the reaction with the polyisocyanate; and (3) which have at least two radicals reactive with the isocyanato radicals of the polyisocyanate so as to form a polymeric reaction product. The preferred active-hydrogen-containing materials are the polyols having the aforementioned properties.

The polyols employed can have hydroxyl numbers which vary over a wide range. The exact polyol employed depends, among other things, upon the end use of the polyurethane product to be produced. For example, in the case of foamed reaction products, the molecular weight of the hydroxyl number is selected preferably to result in flexible, semiflexible, or rigid foams. In such applications, the polyols preferably possess a hydroxyl number of from about 200 to about 1000 when employed in rigid foam formulations, from about 50 to about 150 for semiflexible foams, and from about 20 to about 70 or more when employed in flexible foam formations. Such limits are not intended to be restrictive, but are merely illustrative of the large number of combinations possible.

As referred to earlier, the vinylidene chloride polymer powders are advantageously incorporated into polyurethanes by first forming a dispersion of the powder in the desired polyol. Generally, the resulting dispersions should have a viscosity low enough to permit ready mixing with additional quantities of polyol used, if any, and with the other components of the polyurethane reaction. Furthermore, the resulting dispersions should be at least sufficiently stable to prevent sedimentation during the period required to carry out the polyurethane reaction. If the dispersions are to be prepared and then stored prior to use, it will be appreciated that they should be stable for a much longer period of time, e.g., usually at least about 3 months. Generally the dispersions of the present invention demonstrate such long-term stability requirements, particularly those dispersions containing the smaller vinylidene chloride polymer powder particles.

The polymer/polyol dispersions of the present invention may be used in place of the polyols of the prior art in any of the processes used in preparing polyurethanes. Thus, the dispersions may be used in the prepolymer process, the quasi-prepolymer process or the one-shot process. The polyurethanes may be further reacted with epoxy resins, cured with sulfur, peroxides or other curing agents, or otherwise reacted or modified as known to those skilled in the art.

Referring now to the use of the present vinylidene chloride polymer powders in the preparation of polymeric materials in general, the amount of powder which will be incorporated into a desired polymeric material will depend upon the particular vinylidene chloride polymer powder used and upon the degree to which it is desired to enhance flame-retardancy and/or other beneficial physical properties in the resulting polymeric material, as well as other technical and economic considerations known and understood by those skilled in the art. Generally, the resulting polymeric materials will contain from about 2 to 50 weight percent of vinylidene chloride polymer powder, preferably from about 3 to 30 weight percent. Accordingly, the amount of powder dispersed in the nonsolvent will be adjusted to produce such results.

It will be understood that the resulting polymeric materials may contain further modifying ingredients such as heat and light stabilizers, pigments, conventional flame-retardant synergists, and so forth, as necessary or desired for particular applications, without departing from the scope of the present invention.

With respect to polyurethane foam materials, in particular, surfactants or emulsifiers are frequently used to provide the necessary cell formation and growth for optimum processability. However, polyurethane foam materials prepared from polyols containing the vinylidene chloride polymer powders in accordance with the present invention do not generally require the use of such surfactants or emulsifiers, as will be readily appreciated and understood by those familiar with the performance of polymer/polyol systems which have heretofore been used in the art. Nevertheless, such surfactants or emulsifiers may be advantageously employed, especially when using powders prepared from latices containing the larger-sized vinylidene chloride polymer latex particles inasmuch as such particles have a reduced tendency to improve cell size in the polyurethane foam material. A user can, with only minimal experimentation, determine when such a surfactant or emulsifier will provide improved results in the practice of this invention.

As referred to earlier, the vinylidene chloride polymer powders of the present invention can be moderately stabilized in an environment of high temperature and/or basic compounds, e.g., that environment encountered in preparing polyurethane foam materials, by sequential polymerization with non-vinylidene chloride monomers. Alternatively, or in addition thereto, conventional stabilizers for vinylidene chloride polymers, such as the hindered phenolic antioxidants and the like, may also be employed. It has been found that only marginal improvement in the color of a polyurethane foam material achieved by using certain epoxy stabilizers, such as DER ® epoxy resin obtained from The Dow Chemical Company. Accordingly, it may be necessary for a user to determine by simple preliminary experimentation those stabilizers which will be suitably employed with the vinylidene chloride polymer powders used in the present invention. Suitable stabilizers are preferably used by adding them to the aqueous medium prior to or during the emulsion polymerization of the vinylidene chloride polymer, according to methods which are generally known in the art.

The following specific examples illustrate the invention but are not to be taken as limiting its scope. Parts and percentages are by weight unless otherwise indicated.

EXAMPLE 1

In accordance with the present invention, the following recipe and technique were used to prepare a vinylidene chloride polymer powder which is dispersible in polyols and other nonsolvents for vinylidene chloride polymers:

INITIAL WATER PHASE 1200 g distilled water
6.95 g AEROSOL MA emulsifier (80% active)
6.36 g sodium persulfate

EMULSIFIER FEED STREAM 53 g DOWFAX 2A1 emulsifier (45% active) in 300 g aqueous solution
Used 300 g in 12 hours (Feed rate = 25 g/hr)

MONOMERS FOR SEED LATEX REACTION 100 g vinylidene chloride (VDC)
100 g acrylonitrile. (AN)
Used 90 g in seed latex reaction

MONOMER MIX 1000 g VDC
1000 g AN
Used 1500 g in 12 hours (Feed rate = 125 g/hr)

The initial water phase was introduced into a 3-liter reactor and placed under a vacuum of about 25 inches Hg for 10 minutes while being heated to 52° C. While agitating the contents of the reactor at 200 rpm, the vacuum was then shut off and 90 g of the seed latex monomers were introduced. After the seed latex reaction had proceeded to approximately a 2 psi pressure drop from the maximum pressure achieved, introduction of the mixed monomers at 125 g/hr was begun and continued for 12 hours while concurrently adding the emulsifier stream at a rate of 25 g/hr. At the end of that period, the mixed monomer and emulsifier streams were shut off and a 2% solution of sodium bisulfite was added at a rate of 25 g/hr for 1.5 hours to complete the reaction.

The resultant latex, containing a polymer comprising about 50% VDC and 50% AN was recovered by the following technique: 30 ml of 32% calcium chloride was added to 800 ml of water and heated to 50° C. with vigorous stirring. The latex was then added slowly while continuing the vigorous agitation. As soon as some growth of coagulated particles was observed, the mixture was cooled as rapidly as possible and the coagulum collected in a centrifuge. The coagulum was washed 10 minutes with a water spray and then allowed to dry in a tray at room temperature.

EXAMPLE 2

In accordance with the present invention, a number of vinylidene chloride polymer powders were recovered from latices and dispersed in VORANOL ® 4701 polyol, a nonsolvent for vinylidene chloride polymers. Each dispersion was prepared by mixing 100 g of the polyol and 15 g of the desired powder in a high-speed blender for 15 minutes. The dispersions were then cooled to 20° C. and evaluated for dispersion quality by observing dispersion particle size and sedimentation rate.

Polyurethane foam materials were then prepared from the cooled dispersions according to a standard technique and recipe: The following ingredients were first mixed with each dispersion in a high-speed blender for 70 seconds:

(a) 1 g of a blend consisting of 45% dioctyl phthalate, 5% XF11630 silicone surfactant, and 50% Q25043 silicone surfactant (both silicone surfactants were obtained from Dow Corning Corporation)
(b) 0.4 g DABCO ® 33 LV solution of 33% triethylene diamine in dipropylene glycol
(c) 0.05 g NIAX ® A-1 solution of 70% bis(N,N-dimethylaminoethyl) ether in dipropylene glycol
(d) 0.75 g T-10 solution of 50% stannous octoate in dioctyl phthalate
(e) 1.2 g diethanolamine
(f) 2.6 g water.

Thereafter, 35.2 g toluene diisocyanate was added and the mixture was blended until foaming started. Each foaming mixture was then poured into a container, allowed to rise for 5 minutes, and heated in an oven for 10 minutes at 120° C. The resulting foam materials were compressed to open the cells and then reheated for 15 minutes at 120° C. After aging for 7 days, the foam materials were tested according to ASTM-D-2406 for physical properties.

For comparison, a number of polyurethane foam materials were prepared from the same recipe, but using various vinyl chloride (VC) or vinylidene chloride (VDC) polymer additives.

The results of these tests, as shown in Table I, demonstrate that the dispersions of the present invention are superior in quality to the other dispersions tested. Additionally, the polyurethane foams prepared from such dispersions in accordance with the present invention have a better balance of tear and compressive strength when compared to the foams outside this invention. Furthermore, the foams prepared with the dispersions of the present invention passed the Department of Transportation Motor Vehicle Safety Standard No. 302, thereby demonstrating the flame-retardancy of such materials. Similar good results will be obtained by using any of the dispersions identified in the claims which follow.

der polyol mixture is passed once through a Gifford-Wood colloid mill operating at 10,000 rpm with a gap setting of 0.004 inch and then twice through a Gaulin homogenizer operating at 5000 pounds per square inch, the powder will break down in polyol and regenerate original latex particles; powder particles which do not break down to latex particle size are of a size less than about 100 microns.

2. A polyurethane material prepared from a composition of matter for use in the preparation of urethane polymer foam having enhanced physical properties comprising (A) a nonsolvent for vinylidene chloride polymers said non-solvent being a liquid organic reactant used in the preparation of said foam, and (B) a vinylidene chloride polymer powder, having a second order transition temperature of at least about 50° C., which is dispersible in the nonsolvent, said powder being obtained by a method comprising the steps of (I) preparing a vinylidene chloride polymer latex by emulsion polymerizing about 50 to about 65 weight

TABLE I

| | Polymer Additive | | | | Polyurethane Foam Material | | | | |
|---|---|---|---|---|---|---|---|---|---|
| Sample | Composition | Particle Size (micron) | Tg[1] (°C.) | Dispersion Quality | Tear Strength (lb/in) | 25% Compression (lb/4 in$^2$) | 65% Compression (lb/4 in$^2$) | Modulus | Density |
| Control | | | | | 1.0 | 1.0 | 2.0 | 2.0 | 2.0 |
| | | | | For Comparison | | | | | |
| 1 | 80 VDC/20 AN | 0.13[2] | 40 | very poor | 2.05 | 1.0 | 2.43 | 2.43 | 2.28 |
| 2 | 70 VDC/30 MMA | 0.18[2] | 53 | poor | 1.70 | 0.93 | 2.2 | 2.36 | 2.30 |
| 3 | 80 VDC/20 MMA | 0.18[2] | 35 | poor | 1.86 | 0.70 | 1.67 | 2.38 | 2.23 |
| 4 | 100 VC | 0.23[2] | 80 | poor | 2.26 | 0.87 | 2.07 | 2.39 | 2.33 |
| 5 | 90 VDC/10 VC | 200[3] | 0[4] | very poor | 1.93 | 0.87 | 1.93 | 2.21 | 2.22 |
| | | | | The Invention | | | | | |
| 6 | 50 VDC/50 MMA | 0.19[2] | 75 | good | 3.07 | 1.17 | 3.57 | 3.05 | 2.62 |
| 7 | 60 VDC/40 MMA | 0.18[2] | 65 | good | 1.85 | 1.17 | 2.8 | 2.39 | 2.27 |
| 8 | 50 VDC/50 AN | 0.25[2] | 75 | good | 2.26 | 1.07 | 2.6 | 2.43 | 2.27 |

Notes:
MMA = methyl methacrylate
[1] second order transition temperature
[2] size of the latex particles prior to recovery
[3] a suspension polymerized product
[4] due to the plasticization of the polymer prior to use

What is claimed is:

1. A composition of matter for use in the preparation of polymeric materials having enhanced physical properties comprising (A) a nonsolvent for vinylidene chloride polymers and (B) a vinylidene chloride polymer powder, having a second order transition temperature of at least about 50° C., which is dispersed in the nonsolvent, said powder being obtained by a method comprising the steps of (I) preparing a vinylidene chloride polymer latex by emulsion polymerizing about 50 to about 65 weight percent vinylidene chloride and at least one copolymerizable ethylenically unsaturated comonomer and (II) recovering the vinylidene chloride polymer powder from the latex;

wherein the latex polymer particles prior to recovery have a diameter less than about 1 micron, with the further limitation that when 20 weight percent of the powder is mixed with a polyol having a room temperature viscosity of about 900 to 1000 centipoise and the powder polyol mixture is passed once through a Gifford-Wood colloid mill operating at 10,000 rpm with a gap setting of 0.004 inch and then twice through a Gaulin homogenizer operating at 5000 pounds per square inch, the powder will break down in polyol and regenerate original latex particles; powder particles which do not break down to latex particle size are of a size less than about 100 microns.

percent vinylidene chloride and at least one copolymerizable ethylenically unsaturated comonomer and (II) recovering the vinylidene chloride polymer powder from the latex;

(III) redispersing said powder in said nonsolvent;

wherein the latex polymer particles prior to recovery have a diameter less than about 1 micron, with the further limitation that when 20 weight percent of the powder is mixed with a polyol having a room temperature viscosity of about 900 to 1000 centipoise and the powder polyol mixture is passed once through a Gifford-Wood colloid mill operating at 10,000 rpm with a gap setting of 0.004 inch and then twice through a Gaulin homogenizer operating at 5000 pounds per square inch, the powder will break down in polyol and regenerate original latex particles; powder particles which do not break down to latex particle size are of a size less than about 100 microns.

* * * * *

UNITED STATES PATENT AND TRADEMARK OFFICE
CERTIFICATE OF CORRECTION

PATENT NO. : 4,575,529

DATED : Mar. 11, 1986

INVENTOR(S) : Dale S. Gibbs; Jack H. Benson; Reet T. Fernandez

It is certified that error appears in the above-identified patent and that said Letters Patent is hereby corrected as shown below:

Col. 6, line 32 "Generally the" should read --Generally, the--

Col. 7, line 32 "material achieved" should read

--material is achieved-- line 33 "DER® epoxy" should read --DER® 331 epoxy--.

Signed and Sealed this

Eighteenth Day of November, 1986

*Attest:*

DONALD J. QUIGG

*Attesting Officer*     *Commissioner of Patents and Trademarks*